United States Patent
Ye et al.

(10) Patent No.: US 11,874,831 B2
(45) Date of Patent: Jan. 16, 2024

(54) METHOD AND SYSTEM FOR MANAGING EXECUTION PLAN IN GRAPH DATABASE

(71) Applicant: Vesoft Inc., Hangzhou (CN)

(72) Inventors: Xiaomeng Ye, Hangzhou (CN); Shihai Huang, Hangzhou (CN); Pengwei Chen, Hangzhou (CN); Xinglu Yi, Hangzhou (CN)

(73) Assignee: Vesoft Inc., Hangzhou (CN)

( * ) Notice: Subject to any disclaimer, the term of this patent is extended or adjusted under 35 U.S.C. 154(b) by 38 days.

(21) Appl. No.: 17/688,020

(22) Filed: Mar. 7, 2022

(65) Prior Publication Data

US 2023/0062233 A1 Mar. 2, 2023

(30) Foreign Application Priority Data

Aug. 19, 2021 (CN) .......................... 202110954028.9
Sep. 2, 2021 (CN) .......................... 202111046369.2

(51) Int. Cl.
    *G06F 16/2453* (2019.01)
(52) U.S. Cl.
    CPC .............................. *G06F 16/24542* (2019.01)
(58) Field of Classification Search
    CPC ........................ G06F 16/24542; G06F 16/2246
    See application file for complete search history.

(56) References Cited

U.S. PATENT DOCUMENTS

| 9,038,041 B2* | 5/2015 | Salz ......................... G06F 8/34 717/109 |
| 10,275,489 B1* | 4/2019 | Muniswamy Reddy ................. G06F 16/2453 |
| 11,068,520 B1* | 7/2021 | Neumann ........... G06F 16/3332 |
| 2014/0297801 A1* | 10/2014 | Yao ......................... G06F 9/466 709/217 |
| 2018/0081941 A1* | 3/2018 | Foebel .................. G06F 9/4881 |
| 2018/0314733 A1* | 11/2018 | Wen ................. G06F 16/24542 |
| 2021/0240705 A1* | 8/2021 | Trigonakis .......... G06F 16/2471 |

* cited by examiner

*Primary Examiner* — Amresh Singh
*Assistant Examiner* — Fernando M Mari Valcarcel
(74) *Attorney, Agent, or Firm* — Ziegler IP Law Group

(57) ABSTRACT

A method and system for managing an execution plan in a graph database includes: acquiring a graph query language, analyzing the graph query language by using a scanner to generate a predefined Token, and parsing the predefined Token into a data structure by using a parser to obtain an abstract syntax tree; next, processing the abstract syntax tree by using a planner to generate an execution plan, registering a mapping table to store variables in the execution plan and corresponding variable values, and optimizing the execution plan by using an optimizer, where the execution plan includes customized execution operators and customized topologies; and finally, traversing and scheduling the execution plan by using a scheduler, to output an obtained execution result. The present disclosure modularizes the execution operators, improves reusability, and reduces the development cost. The execution plan is scheduled by using an asynchronous notification mechanism, to reduce blocking.

9 Claims, 8 Drawing Sheets

Acquire a graph query language, analyze the graph query language by using a scanner to generate a predefined Token, and parse the predefined Token into a data structure by using a parser to obtain an abstract syntax tree — S101

Process the abstract syntax tree by using a planner to generate an execution plan, and optimize the execution plan by using an optimizer, where the execution plan includes customized execution operators and customized topologies — S102

Traverse and schedule the execution plan by using a scheduler, to output an execution result — S103

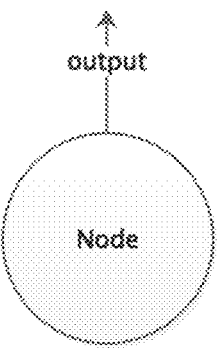
FIG. 2.1
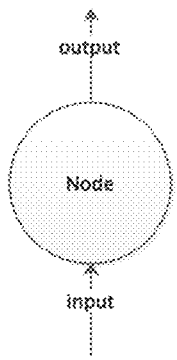
FIG. 2.2
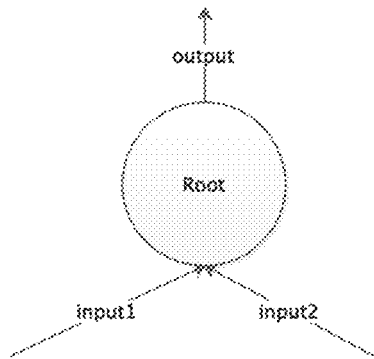
FIG. 2.3
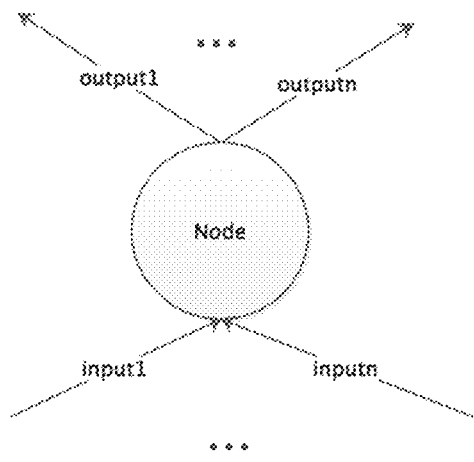
FIG. 2.4

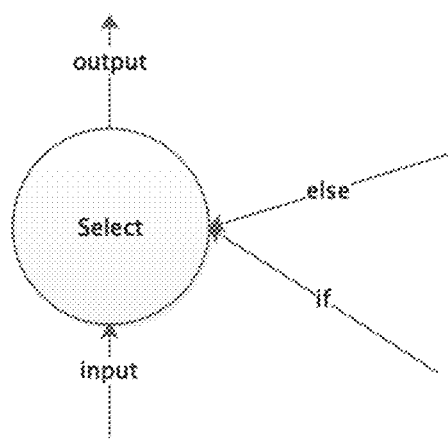
FIG. 2.5
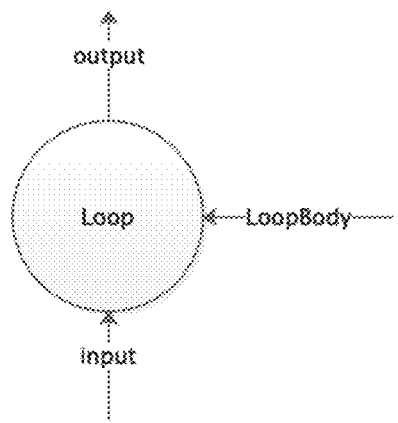
FIG. 2.6

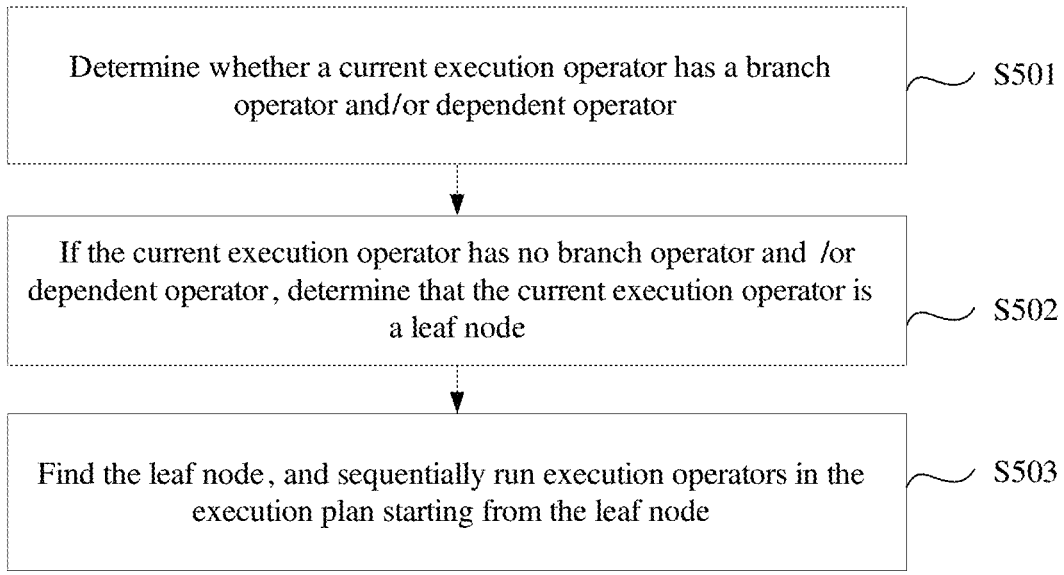
FIG. 5
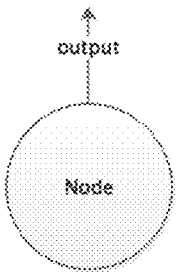
FIG. 6.1
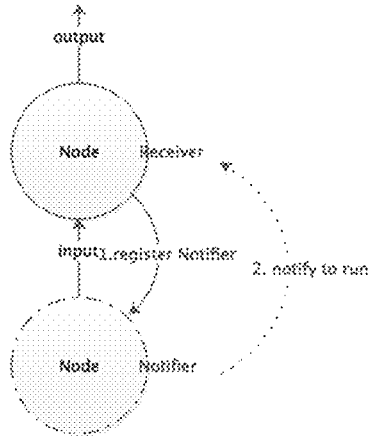
FIG. 6.2

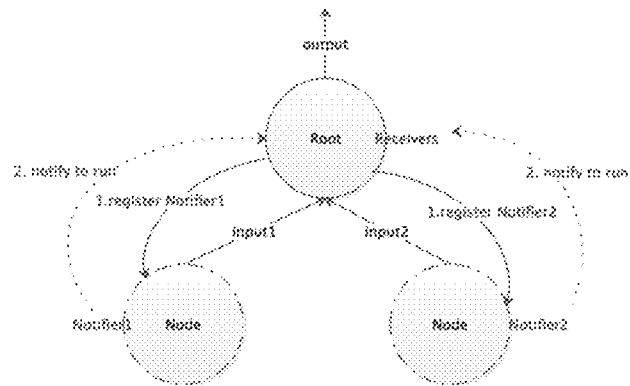
FIG. 6.3
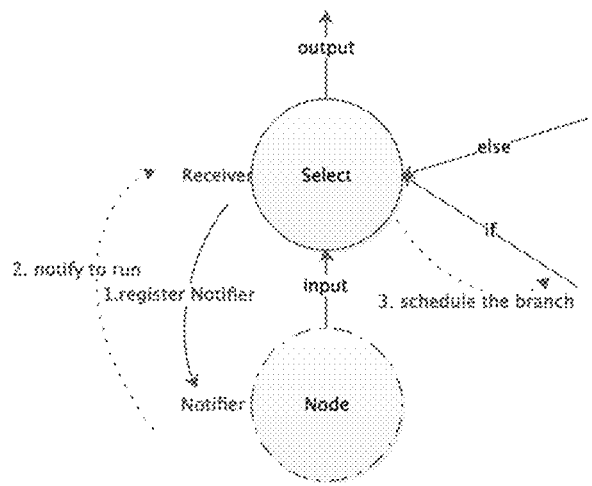
FIG. 6.4
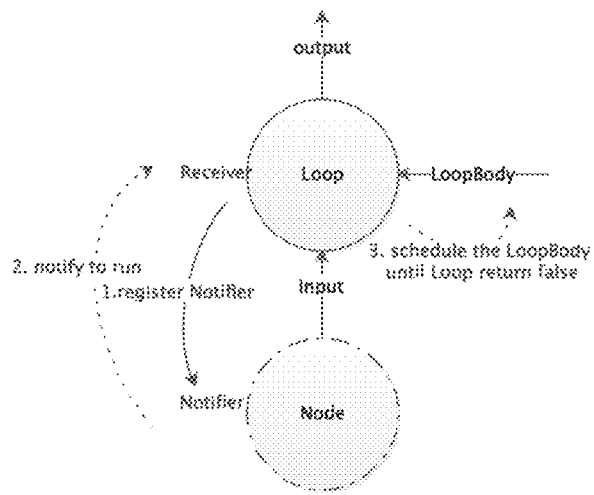
FIG. 6.5

METHOD AND SYSTEM FOR MANAGING EXECUTION PLAN IN GRAPH DATABASE

CROSS REFERENCE TO RELATED APPLICATIONS

This patent application claims the benefit and priority of Chinese Patent Application No. 202110954028.9 filed on Aug. 19, 2021, and Chinese Patent Application No. 202111046369.2 filed on Sep. 2, 2021, the disclosure of which is incorporated by reference herein in their entireties as part of the present application.

TECHNICAL FIELD

The present disclosure relates to the technical field of graph databases, and in particular, to a method and system for managing an execution plan in a graph database.

BACKGROUND

A graph database is a database that stores graph data and provides users with the capability of querying graph data. Generally, a graph database provides a graph query language to enable users to describe required graph data through the graph query language. A graph database generally includes a graph query engine and a graph storage engine, where the graph storage engine is configured to store graph data and the graph query engine is configured to query graph data. The graph query engine mainly includes the following components: a scanner, a parser, a semantic analyzer, a planner, an optimizer, and a scheduler, where an execution plan is a graph topology composed of multiple execution nodes dependent on each other. Such a graph topology can be used to pull graph data from the graph database and perform various computation logic, and finally output a final result to the user.

In the related art, the execution plan in the graph database requires special code to execute the related query language and cannot be reused. In addition, scheduling of the execution plan is synchronous and cannot be parallelized.

No effective solution has been proposed to solve the problems of high development cost and inflexible execution due to the fact that the execution code of the execution plan in the graph database cannot be reused and scheduling of the execution cannot be parallelized.

SUMMARY

Embodiments of the present disclosure provide a method and system for managing an execution plan in a graph database, to at least solve the problems of high development cost and inflexible execution in the related art due to the fact that the execution code of the execution plan in the graph database cannot be reused and scheduling of the execution cannot be parallelized.

According to a first aspect, the embodiments of the present disclosure provide a method for managing an execution plan in a graph database, including:

acquiring a graph query language, analyzing the graph query language by using a scanner to generate a predefined Token, parsing the predefined Token into a data structure by using a parser, and obtaining an abstract syntax tree;

processing the abstract syntax tree by using a planner to generate an execution plan, and optimizing the execution plan by using an optimizer, where the execution plan includes customized execution operators and customized topologies; and traversing and scheduling the execution plan by using a scheduler, to output an execution result.

In some embodiments, the traversing the execution plan by using a scheduler includes:

traversing the execution plan in a breadth-first search manner by using the scheduler, and establishing a complete message notification flow for all execution nodes running execution operators in the execution plan, where the execution nodes and the execution operators correspond to each other in a one-to-one manner in the execution plan; and during generation of the execution plan, registering a mapping table to store variables in the execution plan and corresponding variable values, and traversing the execution plan in a pre-order traversal manner by using the scheduler, to find out end users of all the variables in the mapping table.

In some embodiments, the establishing a complete message notification flow for all execution nodes running execution operators in the execution plan includes:

registering a message notifier for a dependent node of each execution node in the execution plan respectively, wherein each of the execution nodes stores a corresponding message receiver.

In some embodiments, the scheduling the execution plan by using a scheduler includes:

sending a message to a current execution node by using a message notifier of a dependent node of the current execution node in the execution plan;

receiving the message by a message receiver of the execution node, and executing the execution plan or performing error processing of the execution plan on the current execution node according to the message; and in the process of executing the execution plan on the execution node, if a current execution operator is an end user of an input variable in a mapping table, releasing a variable value corresponding to the input variable after execution of the current execution operator is completed, where an operator using the input variable is called the current execution operator.

In some embodiments, the execution plan is executed in the following sequence: executing a dependent operator of a current execution operator by an execution node first, and then executing the current execution operator.

In some embodiments, the step of executing a dependent operator of a current execution operator by an execution node first, and then executing the current execution operator includes:

determining whether the current execution operator has a branch operator and/or a dependent operator;

if the current execution operator does not have the branch operator and/or the dependent operator, determining that the execution node of the current execution operator is a leaf node; and sequentially executing execution operators in the execution plan starting from the leaf node.

In some embodiments, after the executing the execution plan on the current execution node according to the message, the method includes:

dynamically scheduling the execution node by using the scheduler.

In some embodiments, the dynamically scheduling the execution node by using the scheduler includes:

scheduling a branch by the scheduler according to an execution result of a branch selection node; and scheduling a LoopBody branch by the scheduler according to an execution result of a loop node, where when the execution result of the loop node is false, the loop ends; otherwise, the loop continues.

In some embodiments, the traversing the execution plan in a pre-order traversal manner by using the scheduler, to find out end users of all the variables in the mapping table includes:

traversing the execution plan by using the scheduler in a sequence reverse to an execution sequence of the execution plan, where an execution operator that first cites a variable in the mapping table is the end user of the variable.

In some embodiments, before the variables and the corresponding variable values are stored into a mapping table, the method further includes:

if it is determined that a variable in the mapping table is not used by any execution operator, skipping storing a variable value corresponding to the variable into the mapping table.

In some embodiments, after the abstract syntax tree is obtained, the method includes:

analyzing the abstract syntax tree by using a semantic analyzer, and determining whether semantics of the abstract syntax tree is valid, wherein validity of the semantics can be customized by a user.

In some embodiments, the mapping table stores variable names, and the number of the variable names remains unchanged after registration.

According a second aspect, the embodiments of the present disclosure provide a system for managing an execution plan in a graph database, including:

a parsing module, configured to acquire a graph query language, analyze the graph query language by using a scanner to generate a predefined Token, and parse the predefined Token into a data structure by using a parser to obtain an abstract syntax tree;

a generation and optimization module, configured to process the abstract syntax tree by using a planner to generate an execution plan, register a mapping table to store variables in the execution plan and corresponding variable values, and optimize the execution plan by using an optimizer, wherein the execution plan comprises customized execution operators and customized topologies; and a scheduling module, configured to traverse and schedule the execution plan by using a scheduler, to output an execution result.

In some embodiments, the scheduling module is further configured to traverse the execution plan in a breadth-first search manner by using the scheduler, and establish a complete message notification flow for all execution nodes running execution operators in the execution plan, where the execution nodes and the execution operators correspond to each other in a one-to-one manner in the execution plan; and the scheduling module is further configured to traverse the execution plan in a pre-order traversal manner by using the scheduler, to find out end users of all the variables in the mapping table.

In some embodiments, the scheduling module is further configured to register a message notifier for a dependent node of each execution node in the execution plan respectively, where each of the execution nodes stores a corresponding message receiver.

In some embodiments, the scheduling module is further configured to send a message to a current execution node by using a message notifier of a dependent node of the current execution node in the execution plan;

the scheduling module is further configured to: after a message receiver of the execution node receives the message, execute execution plan or perform error processing of the execution plan on the current execution node according to the message; and the scheduling module is further configured to: in the process of executing the execution plan on the execution node, if a current execution operator is an end user of an input variable in the mapping table, release a variable value corresponding to the input variable after execution of the current execution operator is completed, where an operator using the input variable is called the current execution operator.

In some embodiments, the execution plan is executed in the following sequence: executing a dependent operator of a current execution operator by an execution node first, and then executing the current execution operator.

In some embodiments, the scheduling module is further configured to determine whether the current execution operator has a branch operator and/or a dependent operator;

if the current execution operator does not have the branch operator and/or the dependent operator, determine that the execution node of the current execution operator is a leaf node; and sequentially execute execution operators in the execution plan starting from the leaf node.

In some embodiments, after the executing the execution plan on the current execution node according to the message, the scheduling module is further configured to dynamically schedule the execution node by using the scheduler.

In some embodiments, the scheduling module is further configured to schedule a branch according the scheduler according to an execution result of a branch selection node; and the scheduling module is further configured to schedule a LoopBody branch according the scheduler according to an execution result of a loop node, where when the execution result of the loop node is false, the loop ends; otherwise, the loop continues.

Compared with the related part, the method for managing an execution plan in a graph database provided by the embodiments of the present disclosure includes: acquiring a graph query language, analyzing the graph query language by using a scanner to generate a predefined Token, and parsing the predefined Token into a data structure by using a parser to obtain an abstract syntax tree; next, processing the abstract syntax tree by using a planner to generate an execution plan, registering a mapping table to store variables in the execution plan and corresponding variable values, and optimizing the execution plan by using an optimizer, where the execution plan includes customized execution operators and customized topologies; and finally, traversing and scheduling the execution plan by using a scheduler, to output an obtained execution result.

The present disclosure achieves the following beneficial effects: 1. In the present disclosure, the execution operators and topologies are customized, and the underlying execution logic of the query language is implemented through the execution plan; the customized execution operators can be reused by different syntaxes or languages to achieve the purpose of modularization and reusability, thus reducing the development cost. 2. The scheduler of the present disclosure schedules the execution plan efficiently through an asynchronous message notification mechanism, to reduce blocking, such that the execution plan can be designed flexibly. In addition, different branches of the execution plan can be executed in parallel and scheduled dynamically, which effectively improves the execution efficiency and achieves the purpose of low latency. 3. In the present disclosure, the execution plan is traversed in a breadth-first search manner, which can prevent the stack overflow caused by a recursive method. 4. In the present disclosure, the execution plan is traversed in a pre-order traversal manner to find out end users (execution operators) of variables, and a corresponding variable is released after execution of an end user is finished, which reduces the invalid memory usage and improves the operational stability of the graph database.

BRIEF DESCRIPTION OF THE DRAWINGS

The accompanying drawings described here are provided for further understanding of the present disclosure, and constitute a part of the present disclosure. The exemplary embodiments of the present disclosure and illustrations thereof are intended to explain the present disclosure, but do not constitute inappropriate limitations to the present disclosure. In the drawings:

FIGS. 2.1-2.6 are schematic diagrams of various topologies according to an embodiment of the present disclosure;

FIG. 5 is a schematic flowchart of executing an execution plan according to an embodiment of the present disclosure;

FIGS. 6.1-6.5 are schematic diagrams of scheduling mechanisms corresponding to various topologies according to an embodiment of the present disclosure;

Figure 1:
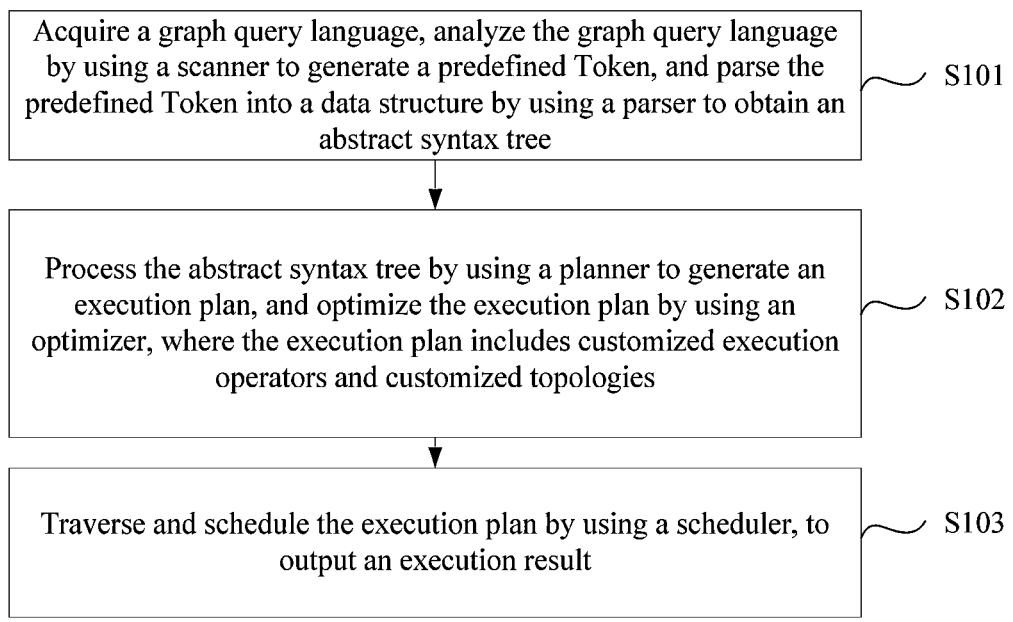
FIG. 1 is a flowchart of a method for managing an execution plan in a graph database according to an embodiment of the present disclosure.

Reference numerals: 71. parsing module; 72. generation and optimization module; 73. scheduling module.

DETAILED DESCRIPTION

To make the objectives, technical solutions, and advantages of the present disclosure clearer, the present disclosure is described below with reference to the accompanying drawings and embodiments. It should be understood that the embodiments described herein are merely used to explain the present disclosure, rather than to limit the present disclosure. All other embodiments obtained by those of ordinary skill in the art based on the embodiments of the present disclosure without creative efforts should fall within the protection scope of the present disclosure.

Apparently, the accompanying drawings in the following description show merely some embodiments of the present disclosure, and a person of ordinary skill in the art may apply the present disclosure to other similar scenarios according to these drawings without creative efforts. In addition, it can also be appreciated that, although it may take enduring and complex efforts to achieve such a development process, for those of ordinary skill in the art related to the present disclosure, some changes such as design, manufacturing or production made based on the technical content in the present disclosure are merely regular technical means, and should not be construed as insufficiency of the present disclosure.

The "embodiment" mentioned in the present disclosure means that a specific feature, structure, or characteristic described in combination with the embodiment may be included in at least one embodiment of the present disclosure. The phrase appearing in different parts of the specification does not necessarily refer to the same embodiment or an independent or alternative embodiment exclusive of other embodiments. It may be explicitly or implicitly appreciated by those of ordinary skill in the art that the embodiment described herein may be combined with other embodiments as long as no conflict occurs.

Unless otherwise defined, the technical or scientific terms used in the present disclosure are as they are usually understood by those of ordinary skill in the art to which the present disclosure pertains. The terms "one", "a", "the" and similar words are not meant to be limiting, and may represent a singular form or a plural form. The terms "include", "contain", "have" and any other variants in the present disclosure mean to cover the non-exclusive inclusion, for example, a process, method, system, product, or device that includes a series of steps or modules (units) is not necessarily limited to those steps or units which are clearly listed, but may include other steps or units which are not expressly listed or inherent to such a process, method, system, product, or device. "Connected", "interconnected", "coupled" and similar words in the present disclosure are not restricted to physical or mechanical connections, but may include electrical connections, whether direct or indirect. The term "multiple" in the present disclosure means two or more. The term "and/or" describes associations between associated objects, and it indicates three types of relationships. For example, "A and/or B" may indicate that A exists alone, A and B coexist, or B exists alone. The character "I" generally indicates that the associated objects are in an "or" relationship. The terms "first", "second", "third" and so on in the present disclosure are intended to distinguish between similar objects but do not necessarily indicate a specific order of the objects.

An embodiment of the present disclosure provides a method for managing an execution plan in a graph database. FIG. 1 is a flowchart of a method for managing an execution plan in a graph database according to an embodiment of the present disclosure. As shown in FIG. 1, the process includes the following steps:

Step S101: Acquire a graph query language, analyze the graph query language by using a scanner to generate a predefined Token, and parse the predefined Token into a data structure by using a parser to obtain an abstract syntax tree.

In this embodiment, a graph query language (GQL), i.e., ASCII code value, is obtained first; the graph query language is analyzed by using the scanner in the graph query engine to generate a predefined Token, which is outputted to the subsequent parser. Then, the parser defines a syntax analysis rule by using various defined Tokens, and parses the predefined Tokens to generate a data structure inside the program, to obtain an abstract syntax tree. The syntax tree is a graphical representation of the structure of a sentence, which represents a derivation result of the sentence and facilitates understanding of the hierarchy of the grammatical structure of the sentence. Simply put, the syntax tree is a tree formed during derivation according to the syntax analysis rule defined by the preset Tokens.

Preferably, after the abstract syntax tree is obtained, in this embodiment, the abstract syntax tree is analyzed by using a semantic analyzer, to determine whether the semantics of the abstract syntax tree is valid, where the validity of the semantics can be customized by the user.

Step S102: Process the abstract syntax tree by using a planner to generate an execution plan, and optimize the execution plan by using an optimizer, where the execution plan includes customized execution operators and customized topologies.

Preferably, in this embodiment, a planner generates an execution plan from the abstract syntax tree, where the execution plan includes customized execution operators and customized topologies. Specifically, Table 1 shows the customized execution operators in this embodiment. In addition, the customized topologies in this embodiment mainly include: no input/one output (leaf node), one input/one output, two inputs/one output, and multiple inputs/multiple outputs; two special nodes, namely, Select/Loop, are used for implementing selection and looping respectively. It should be noted that, the topology refers to positions of and a relationship among the execution nodes in the execution plan, and after the execution plan is determined, the topology remains unchanged in the execution stage. FIGS. 2.1-2.6 are schematic diagrams of topologies according to an embodiment of the present disclosure. As shown, the topology of no input/one output in FIG. 2.1 includes the following execution operators: GetNeighbors, GetVertices, and GetEdges; the topology of one input/one output in FIG. 2.2 includes the following execution operators: Sort, Dedup, Project, Filter, Limit, and Aggregate; the topology of two inputs/one output in FIG. 2.3 includes the following execution operators: Union, Minus, Intersect, and Join; the topology of multiple inputs/multiple outputs in FIG. 2.4 includes the following execution operator: PassThrough; the Select node in FIG. 2.5 is essentially one input/one output, with two extra branches for implementing selection, which are if branch and else branch respectively; the Loop node in FIG. 2.6 is essentially one input/one output, with a LoopBody for representing a loop body.

TABLE 1

| Operator name | Descriptions |
| --- | --- |
| GetNeighbors | Complete execution of query at one hop in graph semantics |
| GetVertices | For acquiring point data |
| GetEdges | For acquiring edge data |
| Loop | For implementing looping |
| Select | For implementing selection |
| Union | Union |
| Minus | Calculate a difference set |
| Intersect | Calculate an intersection |
| Join | Implement data connection |
| Sort | Sort data |
| Dedup | Deduplication |
| Project | Projection |
| PassThrough | Data transparent transmission node |
| Filter | Data filtering |
| Limit | Data truncation |
| Aggregate | Data aggregation |

Figure 3:
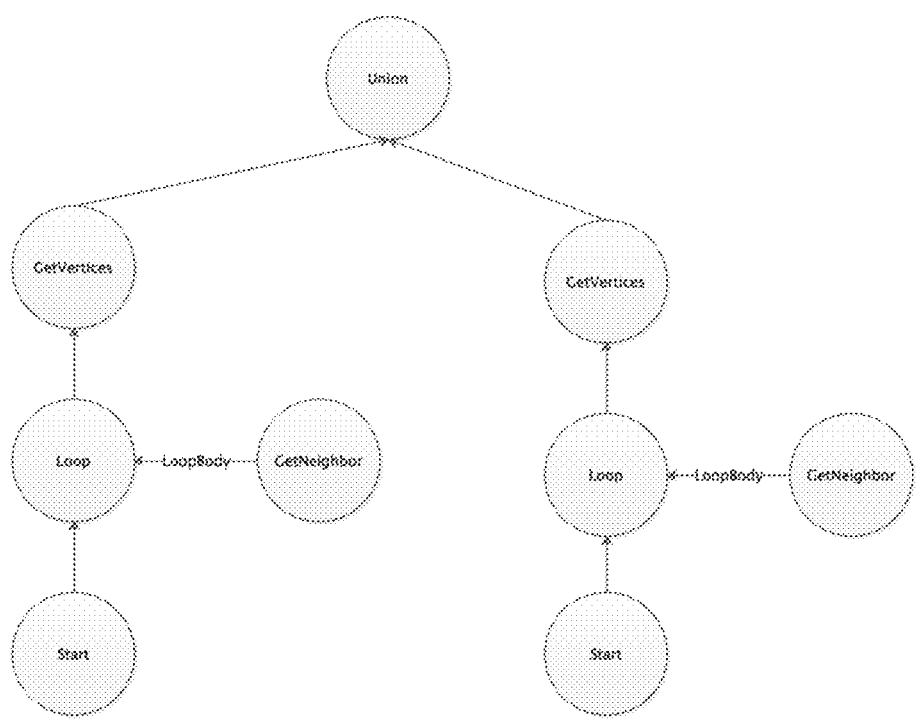
FIG. 3 is a schematic diagram of an instance of an execution plan according to an embodiment of the present disclosure.

FIG. 3 is a schematic diagram of an instance of an execution plan according to an embodiment of the present disclosure. As shown in FIG. 3, GetNeighbor is a one-hop expansion along a certain type of edges in the semantics of the graph; Loop denotes a loop node; GetVertices denotes obtaining points; and Union denotes a set. The execution plan shown in FIG. 3 is the set of outputted N-hop destination points. Specifically, the Loop node performs one-hop expansion along a certain type of edges cyclically, points are obtained through GetVertices, and finally the points are aggregated into the Union set.

Further, after the execution plan is generated, the execution plan is optimized by using the optimizer in this embodiment. Specifically, one execution plan is optimized based on some rules or based on some costs, to obtain an optimal execution plan.

In this embodiment, the execution operators and topologies are customized, and the underlying execution logic of the query language is implemented through the execution plan. The customized execution operators can be reused by different syntaxes or languages to achieve the purpose of modularization and reusability, thus reducing the development cost.

Step S103: Traverse and schedule the execution plan by using a scheduler, to output an execution result. It should be noted that, the scheduler has a scheduling function and a traversing function. Each node in the execution plan will register a message notifier (Notifier) on other nodes dependent on the current node, while a message receiver (Receiver) will be registered and saved on the current node.

Preferably, from a topological perspective, the execution plan of the graph database in this embodiment is a Directed Acyclic Graph (DAG) composed of multiple operators. That is, the generated execution plan is a DAG. In mathematics, especially in graph theory and computer science, a DAG refers to a directed graph with no loops. For example, if there is a non-DAG and a loop is formed from point A, to point B, and then back to point A through point C, a DAG can be formed by changing edge direction of C-to-A to A-to-C. Therefore, two traversal mechanisms used in this embodiment are pre-order traversal and breadth-first search, respectively.

Preferably, the execution plan is traversed in a breadth-first search manner, and a complete message notification flow is established for all execution nodes running execution operators in the execution plan. Specifically, a message notifier is registered for a dependent node of each execution node in the execution plan respectively, and each of the execution nodes stores a corresponding message receiver, where the execution nodes and the execution operators correspond to each other in a one-to-one manner in the execution plan.

Preferably, during generation of the execution plan, a mapping table is registered to store variables in the execution plan and corresponding variable values, and the execution plan is traversed in a pre-order traversal manner, to find out end users of all the variables in the mapping table. In other words, before the execution plan is executed, by finding out the end users of the variables in the mapping table through pre-order traversal, the process of analyzing whether the current execution operator is the end user of the input variable has been completed. In the subsequent execution process, an analysis result is directly read (whether the current execution operator is the end user of the input variable) for determination, which facilitates subsequent use. It should be noted that, each variable in the mapping table generally has one end user, that is, the end user of the input variable is an execution operator that last uses the variable.

Specifically, the execution plan is traversed in a pre-order traversal manner (in a sequence reverse to an execution sequence of the execution plan), where an operator that first cites the input variable is the end user. It should be noted that, a normal execution sequence of the execution plan is post-order traversal. Simply put, before execution of a certain operator in the execution plan, a dependent operator of the operator will be executed first, while the dependent operator will also executes its own dependent operator. In this way, the traversal proceeds to a leaf node of the execution plan (that is, an operator with no dependent operator). Three operators: operator 3, operator 2, and operator 1, are taken as an example for description. The operator 3 depends on the operator 2, the operator 2 depends on the operator 1, and the operator 1 does not depend on any operator. In this case, the execution sequence of the execution plan is as follows: operator 1, operator 2, operator 3. The pre-order traversal is to traverse the operator 3, the operator 2, and the operator 1 in a sequence reverse to the execution sequence. If the operator that first cites the input variable A is the operator 3 in the pre-order traversal, the operator 3 is the end user of the variable A. In this way, after the execution plan is traversed once, end users of all the variables are obtained through analysis. Then, during execution of the execution plan, it is checked, after execution of each operator, whether the operator is the end user of the input variable, and if yes, the variable is released. In this way, each variable is immediately released after being used for the last time, which minimizes the invalid memory usage.

Figure 4:
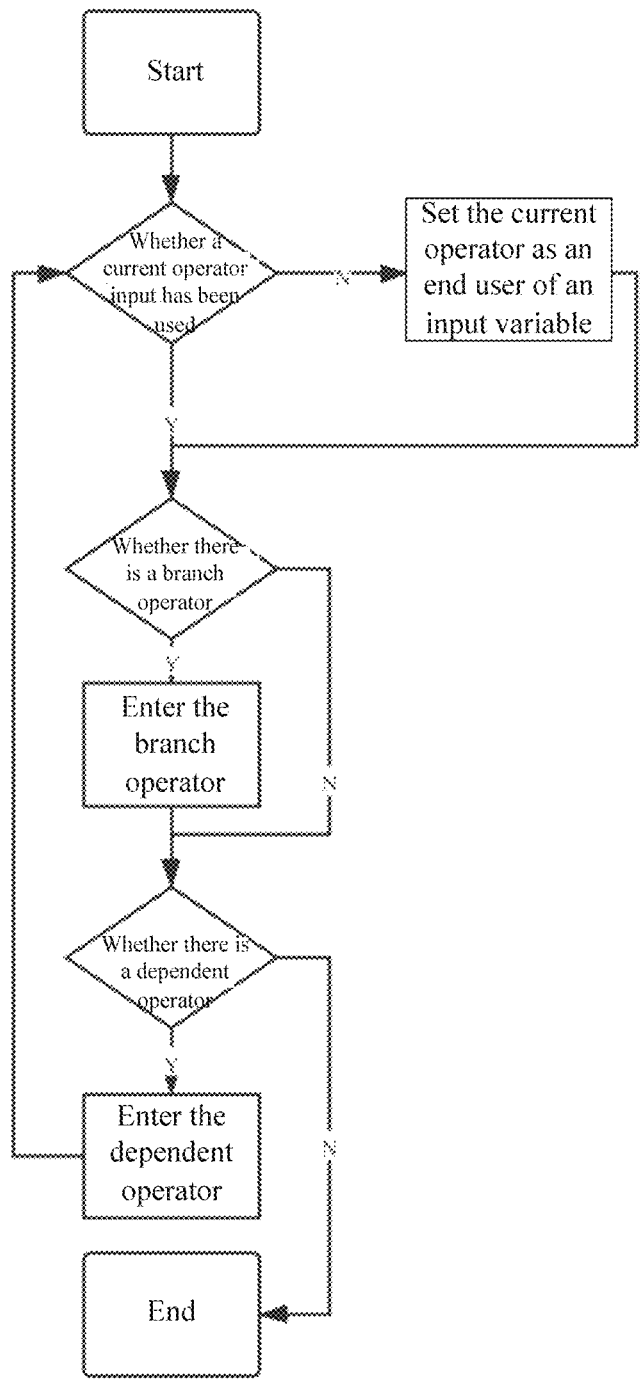
FIG. 4 is a schematic flowchart of specifically determining an end user of a variable according to an embodiment of the present disclosure.

At present, the memory management in the graph database is very rough. In a commonly used approach, no additional processing is performed on intermediate variables, and all the variables are released uniformly after the query execution is finished. Many intermediate variables are useless in the query process, but are still not released, which not only causes a large amount of invalid memory usage but also increases the query time. Such an approach works fine for simple queries. However, for queries with a large data volume or a large number of concurrent queries, the memory usage keeps growing, which leads to query failures and even service exceptions, reducing the stability of the graph database. In order to solve this problem, in some embodiments, FIG. 4 is a schematic flowchart of specifically determining an end user of a variable according to an embodiment of the present disclosure. As shown in FIG. 4, the execution plan will have some branch structures with special meanings, such as loop and conditional branches; the loop branch will be executed cyclically during execution, and the conditional branch will be executed depending on a condition value during execution. The process specifically includes the following steps:

Step S401: Traverse operators in the execution plan in a pre-order traversal manner, and determine whether an input variable of a current execution operator has been used before being inputted.

Step S402: If it is determined that the input variable of the current execution operator has not been used, set the current execution operator as an end user of the input variable, where in this embodiment, an existing function or algorithm can be used to determine whether the input variable of the current execution operator has been used, and certainly in other embodiments, other functions or algorithms with less memory usage can be used, which are not specifically limited herein.

Step S403: If it is determined that the current execution operator has been used, further determine whether the current execution operator has a branch operator, where an existing function or algorithm can be used to determine whether the current execution operator has a branch operator, and certainly in other embodiments, other functions or algorithms with less memory usage can be used, which are not specifically limited herein.

Step S404: If the current execution operator has a branch operator, enter the branch operator and determine whether the branch operator has a dependent operator, where an existing function or algorithm can be used to determine whether there is a dependent operator, and certainly in other embodiments, other functions or algorithms with less memory usage can be used, which are not specifically limited herein.

Step S405: If the current execution operator has no branch operator, determine whether the current execution operator has a dependent operator, where an existing function or algorithm can be used to determine whether there is a dependent operator, and certainly in other embodiments, other functions or algorithms with less memory usage can be used, which are not specifically limited herein.

Step S406: If it is determined in step S404 or step S405 that there is no dependent operator, it indicates that all the execution operators in the execution task have been traversed, and an end user of each variable in a mapping table is obtained.

Step S407: If it is determined in step S404 or step S405 that there is a dependent operator, set the dependent operator as the current execution operator, and continue to perform step S401 to step S406 cyclically.

Through step S401 to step S407 above, in this embodiment, if it is determined that the current execution operator has not been used, the variable outputted by the operator has not been used, and is not stored in the mapping table, thereby reducing invalid memory usage. Then, according to the previous analysis result (the analysis result indicates whether the current execution operator is the end user of the input variable), it is determined whether the current execution operator is the end user of the input variable, and if yes, releasing the value of the corresponding input variable, thereby minimizing the invalid memory usage and improving the stability of the graph database.

In some embodiments, the scheduling mechanism used in this embodiment is an asynchronous message notification mechanism. Specifically, a message notifier of a dependent node in the execution plan sends a message to the node; next, the message receiver on the node receives the sent message, and the execution plan is executed or error processing of the execution plan is performed on the node according to the received message; in addition, in the execution process, it is directly determined whether the current execution operator is the end user of the input variable, and if yes, the input variable is released.

FIG. 5 is a schematic flowchart of executing an execution plan according to an embodiment of the present disclosure. As shown in FIG. 5, the process specifically includes the following steps:

Step S501: Determine whether a current execution operator has a branch operator and/or dependent operator, where each operator points to its dependent operator through a pointer, and each operator can have any number of inputs and 0 or 1 output.

Step S502: If the current execution operator has no branch operator and/or dependent operator, determine that the current execution operator is a leaf node.

Step S503: Find the leaf node, and sequentially run execution operators in the execution plan starting from the leaf node. Specifically, a message notifier of a dependent node of the current execution node in the execution plan sends a message to the current execution node; a message receiver of the execution node receives the message, and the execution plan is executed or error processing of the execution plan is performed on the current execution node according to the message. In the execution process of the execution plan, if the current execution operator is an end user of an input variable in a mapping table, a variable value corresponding to the input variable is released after execution of the current execution operator is completed, where the execution nodes and the execution operators correspond to each other in a one-to-one manner in the execution plan, that is, the current execution node corresponds to the current execution operator.

In some embodiments, after the execution plan is executed on the node according to the received message, in this embodiment, the scheduler schedules the node dynamically. Preferably, the scheduler may schedule a branch according to an execution result of a branch selection node (Select), to implement dynamic scheduling of branch selection. Alternatively, the scheduler schedules a LoopBody branch according to an execution result of a loop node (Loop); when the execution result of the loop node is false, the loop ends; otherwise, the loop continues, thus implementing dynamic scheduling of the loop.

Specifically, FIGS. 6.1-6.5 are schematic diagrams of scheduling mechanisms corresponding to various topologies according to an embodiment of the present disclosure. As shown, in the topology of no input/one output in FIG. 6.1, because there is no directly dependent node, the scheduler will directly create a task of the node (Node) and put the task into a task pool. In the topology of one input/one output in FIG. 6.2, the node has one input and one output, and when scheduling the node, the scheduler will register a notifier with a dependent node (register Notifier); after the dependent node completes execution, the node will be notified to start execution (Notify to run). The topology of two inputs/one output in FIG. 6.3 has two inputs (input1, input2) and one output (output). When scheduling the node, the scheduler needs to register notifiers with two dependent nodes simultaneously (register Notifier1, register Notifier2); after all the dependent nodes complete execution, the node will be notified to start execution (Notify to run). The topology of multiple inputs/multiple outputs has multiple inputs and multiple outputs. When scheduling the node, the scheduler needs to register notifiers with all the dependent nodes simultaneously; after all the dependent nodes complete execution, the node will be notified to start execution. The Select node in FIG. 6.4 is essentially one input (input) and one output (output), but the Select node further has two special dependencies, i.e., IF branch and ELSE branch. When scheduling the Select node, the scheduler registers a notifier with a dependent node of the Select node (register Notifier); after the Select node is notified to start execution (Notify to run), the scheduler will schedule the IF branch or ELSE branch (schedule the branch) based on an execution result of the Select node, i.e., true or false. The IF branch and ELSE branch are scheduled in the same manner as the entire execution plan, such that dynamic scheduling of branch selection based on an asynchronous message mechanism is implemented. The Loop node in FIG. 6.5 is also one input (input) and one output (output) essentially, except that the Loop node will have an extra dependent node: LoopBody. When scheduling the Loop node, the scheduler still needs to register a notifier with a dependent node of the Loop node (register Notifier), to trigger execution of the current execution node through the notifier of the dependent node (Notify to run); then, the scheduler will schedule the LoopBody branch based on an execution result of the Loop node, i.e., true or false; when the execution result of the Loop node is false, the loop ends; otherwise, the loop continues (schedule the LoopBody until Loop return false). In this way, dynamic scheduling of branch selection based on an asynchronous message mechanism is implemented.

The scheduler of this embodiment schedules the execution plan efficiently through an asynchronous message notification mechanism, to reduce blocking, such that the execution plan can be designed flexibly. In addition, different branches of the execution plan can be executed in parallel and scheduled dynamically, which effectively improves the execution efficiency and achieves the purpose of low latency. Moreover, in this embodiment, the execution plan is traversed in a breadth-first search manner, which can prevent the stack overflow caused by a recursive method.

Through step S101 to step S103 above, the execution operators and topologies are customized in the embodiments of the present disclosure, and the underlying execution logic of the query language is implemented through the execution plan. The customized execution operators can be reused by different syntaxes or languages to achieve the purpose of modularization and reusability, thus reducing the development cost. Moreover, in the present disclosure, the execution plan is scheduled efficiently through an asynchronous message notification mechanism, to reduce blocking, such that the execution plan can be designed flexibly. In addition, different branches of the execution plan can be executed in parallel and scheduled dynamically, which effectively improves the execution efficiency and achieves the purpose of low latency. The present disclosure solves the problems of high development cost and inflexible execution due to the fact that the execution code of the execution plan in the graph database cannot be reused and scheduling of the execution cannot be parallelized.

Moreover, in the related art, no additional processing is performed on intermediate variables of the execution plan in the graph database, and all the variables are released uniformly after the query execution is finished. For queries with a large data volume or a large number of concurrent queries, the memory usage keeps growing, which leads to query failures and even service exceptions before the entire query execution is completed. Through step S101 to step S103 above, by finding out the end users of the variables through pre-order traversal, an analysis result indicating the end users of the variables in the mapping table is obtained. During execution of the execution task, the analysis result is directly read for determination. If the current operator is the end user of the input variable, the variable value corresponding to the input variable is released after execution of the current operator is completed. That is, in the process of the execution plan, stored input variables are released in real time, which greatly reduces the invalid memory usage, and solves the problem of query failures or even service exceptions caused by the constantly growing memory usage in the case of queries with a large data volume or a large number of concurrent queries.

It should be noted that, steps shown in the foregoing process or the flowchart in the accompanying drawings may be executed in a computer system such as a set of computer executable instructions. Moreover, although a logic sequence is shown in the flowchart, the shown or described steps may be executed in a sequence different from that described here.

This embodiment further provides a system for managing an execution plan in a graph database, for implementing the foregoing embodiments and preferred implementation manners, which have been illustrated and are not described again. As used below, the terms "module", "unit", and "subunit" and the like may implement the combination of software and/or hardware having predetermined functions.

Although the apparatus described in the following embodiments is preferably implemented by software, implementation by hardware or the combination of the software and the hardware is also possible and may be conceived.

Figure 7:
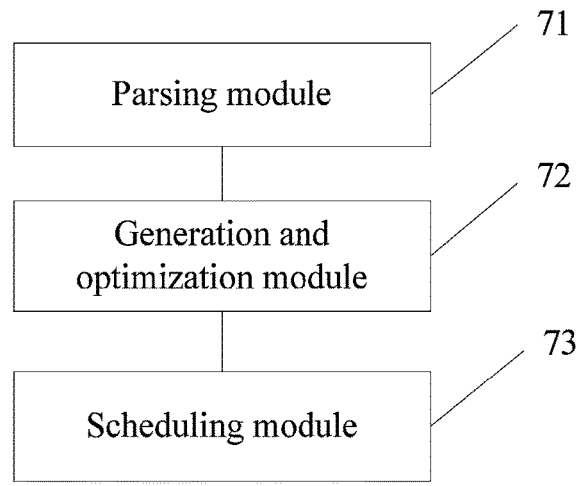
FIG. 7 is a structural block diagram of a system for managing an execution plan in a graph database according to an embodiment of the present disclosure.

FIG. 7 is a structural block diagram of a system for managing an execution plan in a graph database according to an embodiment of the present disclosure. As shown in FIG. 7, the system includes a parsing module 71, a generation and optimization module 72, and a scheduling module 73:

The parsing module 71 is configured to acquire a graph query language, analyze the graph query language by using a scanner to generate a predefined Token, and parse the predefined Token into a data structure by using a parser to obtain an abstract syntax tree; the generation and optimization module 72 is configured to process the abstract syntax tree by using a planner to generate an execution plan, register a mapping table to store variables in the execution plan and corresponding variable values, and optimize the execution plan by using an optimizer, where the execution plan includes customized execution operators and customized topologies; and the scheduling module 73 is configured to traverse and schedule the execution plan by using a scheduler, to output an execution result.

Through the foregoing system, the generation and optimization module 72 in the embodiments of the present disclosure customizes the execution operators and topologies, and the underlying execution logic of the query language is implemented through the execution plan. The customized execution operators can be reused by different syntaxes or languages to achieve the purpose of modularization and reusability, thus reducing the development cost. The scheduling module 73 schedules the execution plan efficiently through an asynchronous message notification mechanism, to reduce blocking, such that the execution plan can be designed flexibly. In addition, different branches of the execution plan can be executed in parallel and scheduled dynamically, which effectively improves the execution efficiency and achieves the purpose of low latency. The present disclosure solves the problems of high development cost and inflexible execution due to the fact that the execution code of the execution plan in the graph database cannot be reused and scheduling of the execution cannot be parallelized. By finding out the end users of the variables in the mapping table through pre-order traversal, during execution of the execution task, it is directly determined whether the current operator is the end user of the input variable, and if yes, the variable value corresponding to the input variable is released after execution of the current operator is completed. That is, in the process of the execution plan, stored input variables are released in real time, which greatly reduces the invalid memory usage, and solves the problem of query failures or even service exceptions caused by the constantly growing memory usage in the case of queries with a large data volume or a large number of concurrent queries.

It should be noted that, for the specific example in this embodiment, reference may be made to the example described in the embodiments and optional implementation manners described above. Details are not described herein again.

It should be noted that each of the above modules may be a functional module or a program module, and may be implemented by software or hardware. For modules implemented by hardware, the modules can be located in the same processor; or the modules, in any combination, can be located in different processors.

This embodiment further provides an electronic device, including a memory and a processor. The memory stores a computer program, and the processor is configured to perform the steps in any of the method embodiments above by running the computer program.

Optionally, the electronic device may further include a transmission apparatus and an input/output apparatus, where the transmission apparatus is connected to the processor described above, and the input/output apparatus is connected to the processor described above.

In addition, an embodiment of the present disclosure can provide a storage medium to implement the method for managing an execution plan in a graph database in the foregoing embodiments. The storage medium stores a computer program. When the computer program is executed by a processor, any method for managing an execution plan in a graph database in the foregoing embodiments is implemented.

In an embodiment, a computer device is provided. The computer device may be a terminal. The computer device includes a processor, a memory, a network interface, a display, and an input apparatus which are connected through a system bus. The processor of the computer device is configured to provide computing and control capabilities. The memory of the computer device includes a nonvolatile storage medium and an internal memory. The nonvolatile storage medium stores an operating system and a computer program. The internal memory provides an environment for operations of the operating system and the computer program in the nonvolatile storage medium. The network interface of the computer device is configured to communicate with an external terminal through a network. When the computer program is executed by the processor, a method for managing an execution plan in a graph database is implemented. The display of the computer device may be an LCD or an e-ink display; the input apparatus of the computer device may be a touch layer covering the display, or a key, a trackball or a touchpad set on the housing of the computer device, or an external keyboard, a touchpad or a mouse, etc.

Figure 8:
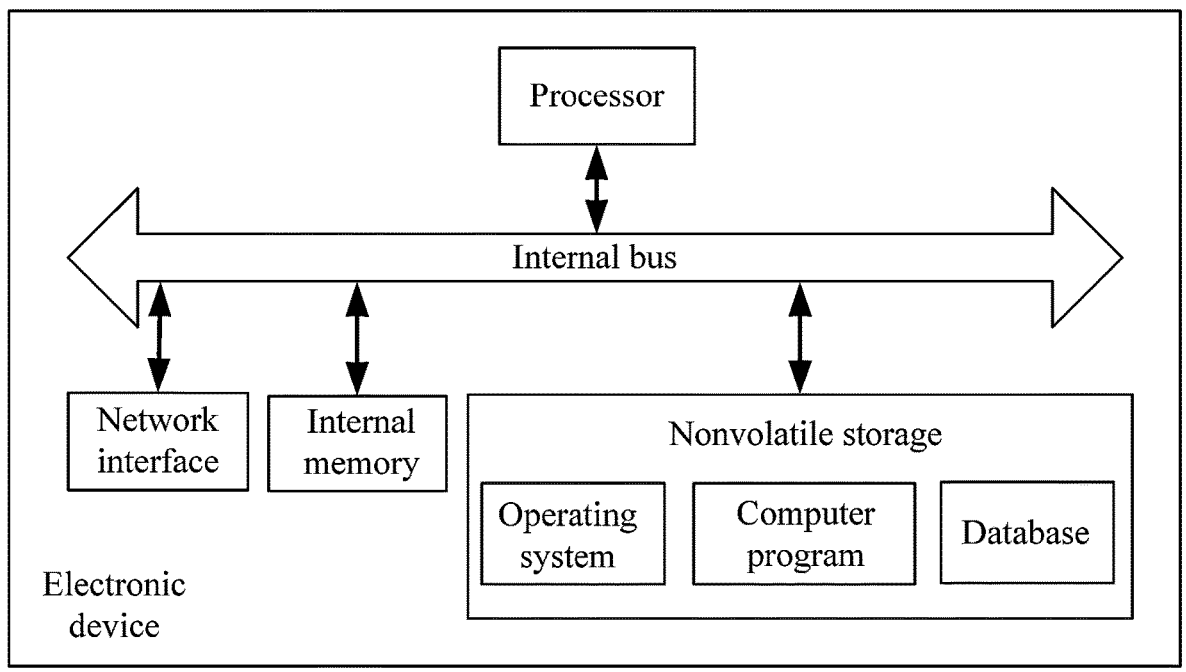
FIG. 8 is a schematic diagram of an internal structure of an electronic device according to an embodiment of the present disclosure.

In an embodiment, FIG. 8 is a schematic diagram of an internal structure of an electronic device according to an embodiment of the present disclosure. As shown in FIG. 8, an electronic device is provided. The electronic device may be a server, and an internal structure thereof may be as shown in FIG. 8. The electronic device includes a processor, a network interface, an internal memory, and a nonvolatile memory that are connected through an internal bus, where the nonvolatile memory stores an operating system, a computer program, and a database. The processor is configured to provide a computing and control capability. The network interface is configured to provide communication with an external terminal through a network connection. The internal memory is configured to provide an environment for running of an operating system and a computer program. When being executed by a processor, the computer program implements the method for managing an execution plan in a graph database. The database is configured to store data.

Those skilled in the art may understand that the structure shown in FIG. 8 is only a block diagram of a part of the structure related to the solution of the present disclosure and does not constitute a limitation on an electronic device to which the solution of the present disclosure is applied. Specifically, the electronic device may include more or fewer components than those shown in the figures, or some components may be combined, or different component arrangements may be used.

Those of ordinary skill in the art may understand that all or some of the procedures in the methods of the foregoing embodiments may be implemented by a computer program instructing related hardware. The computer program may be stored in a nonvolatile computer readable storage medium. When the computer program is executed, the procedures in the embodiments of the foregoing methods may be performed. Any reference used for a memory, a storage, a database, or other mediums used in various embodiments provided in the present application may include a nonvolatile memory and/or a volatile memory. The nonvolatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. As description rather than limitation, the RAM can be obtained in a plurality of forms, such as a static RAM (SRAM), a dynamic RAM (DRAM), a synchronous DRAM (SDRAM), a double data rate SDRAM (DDRS-DRAM), an enhanced SDRAM (ESDRAM), a synchlink DRAM (SLDRAM), a Rambus direct RAM (RDRAM), a direct Rambus dynamic RAM (DRDRAM), and a Rambus dynamic RAM (RDRAM).

Those skilled in the art should understand that, the technical features of the above embodiments can be arbitrarily combined. In an effort to provide a concise description, not all possible combinations of all the technical features of the embodiments are described. However, these combinations of technical features should be construed as disclosed in the description as long as no contradiction occurs.

The above embodiments are merely illustrative of several implementation manners of the present disclosure, and the description thereof is more specific and detailed, but is not to be construed as a limitation to the patentable scope of the present disclosure. It should be pointed out that several variations and improvements can be made by those of ordinary skill in the art without departing from the conception of the present disclosure, but such variations and improvements should fall within the protection scope of the present disclosure. Therefore, the protection scope of the present disclosure should be subject to the protection scope defined by the claims.

What is claimed is:

1. A method for managing an execution plan in a graph database, comprising:
   acquiring a graph query language, analyzing the graph query language by using a scanner to generate a predefined Token, parsing the predefined Token into a data structure by using a parser, and obtaining an abstract syntax tree;
   processing the abstract syntax tree by using a planner to generate an execution plan, and optimizing the execution plan by using an optimizer, wherein the execution plan comprises customized execution operators and customized topologies; and
   traversing and scheduling the execution plan by using a scheduler, to output an execution result;
   wherein the traversing the execution plan by using a scheduler comprises:
   traversing the execution plan in a breadth-first search manner by using the scheduler, and establishing a complete message notification flow for all execution nodes running execution operators in the execution plan, wherein the execution nodes and the execution operators correspond to each other in a one-to-one manner in the execution plan; and
   during generation of the execution plan, registering a mapping table to store variables in the execution plan and corresponding variable values, and traversing the execution plan in a pre-order traversal manner by using the scheduler, to find out end users of all the variables in the mapping table;
   wherein the execution plan is executed in the following sequence: executing a dependent operator of a current execution operator by an execution node first, and then executing the current execution operator;
   wherein in the process of executing the execution plan on the execution node, if a current execution operator is an end user of an input variable in a mapping table, releasing a variable value corresponding to the input variable after execution of the current execution operator is completed, wherein an operator using the input variable is called the current execution operator;
   wherein the traversing the execution plan in a pre-order traversal manner by using the scheduler, to find out end users of all the variables in the mapping table comprises:
   traversing the execution plan by using the scheduler in a sequence reverse to an execution sequence of the execution plan, wherein an execution operator that first cites a variable in the mapping table is the end user of the variable; and
   wherein determining an end user of a variable comprises:
   (Step S401) traversing operators in the execution plan in a pre-order traversal manner, and determine whether an input variable of a current execution operator has been used before being inputted;
   (Step S402) if it is determined that the input variable of the current execution operator has not been used, set the current execution operator as an end user of the input variable;
   (Step S403) if it is determined that the current execution operator has been used, further determine whether the current execution operator has a branch operator;
   (Step S404) if the current execution operator has a branch operator, enter the branch operator and determine whether the branch operator has a dependent operator;
   (Step S405) if the current execution operator has no branch operator, determine whether the current execution operator has a dependent operator;
   (Step S406) if it is determined in (step S404) or (step S405) that there is no dependent operator, it indicates that all the execution operators in the execution task have been traversed, and an end user of each variable in a mapping table is obtained; and
   (Step S407) if it is determined in (step S404) or (step S405) that there is a dependent operator, set the dependent operator as the current execution operator, and continue to perform (step S401) to (step S406) cyclically.

2. The method according to claim 1, wherein the establishing a complete message notification flow for all execution nodes running execution operators in the execution plan comprises:
   registering a message notifier for a dependent node of each execution node in the execution plan respectively, wherein each of the execution nodes stores a corresponding message receiver.

3. The method according to claim 1, wherein the scheduling the execution plan by using a scheduler comprises:
   sending a message to a current execution node by using a message notifier of a dependent node of the current execution node in the execution plan; and receiving the message by a message receiver of the execution node, and executing the execution plan or performing error processing of the execution plan on the current execution node according to the message.

4. The method according to claim 3, wherein after the executing the execution plan on the current execution node according to the message, the method comprises:
dynamically scheduling the execution node by using the scheduler.

5. The method according to claim 4, wherein the dynamically scheduling the execution node by using the scheduler comprises:
scheduling a branch by the scheduler according to an execution result of a branch selection node; and
scheduling a LoopBody branch by the scheduler according to an execution result of a loop node, wherein when the execution result of the loop node is false, the loop ends; otherwise, the loop continues.

6. The method according to claim 1, wherein the step of executing a dependent operator of a current execution operator by an execution node first, and then executing the current execution operator comprises:
determining whether the current execution operator has a branch operator and/or a dependent operator;
if the current execution operator does not have the branch operator and/or the dependent operator, determining that the execution node of the current execution operator is a leaf node; and
sequentially executing execution operators in the execution plan starting from the leaf node.

7. The method according to claim 1, wherein before the variables and the corresponding variable values are stored into a mapping table, the method further comprises:
if it is determined that a variable in the mapping table is not used by any execution operator, skipping storing a variable value corresponding to the variable into the mapping table.

8. The method according to claim 1, wherein after the abstract syntax tree is obtained, the method comprises:
analyzing the abstract syntax tree by using a semantic analyzer, and determining whether semantics of the abstract syntax tree is valid, wherein validity of the semantics can be customized by a user.

9. The method according to claim 1, wherein a mapping table stores variable names, and the number of the variable names remains unchanged after registration of the mapping table.

* * * * *